No. 845,949. PATENTED MAR. 5, 1907.
F. Y. HARRISON.
STEERING GEAR.
APPLICATION FILED JAN. 11, 1906.
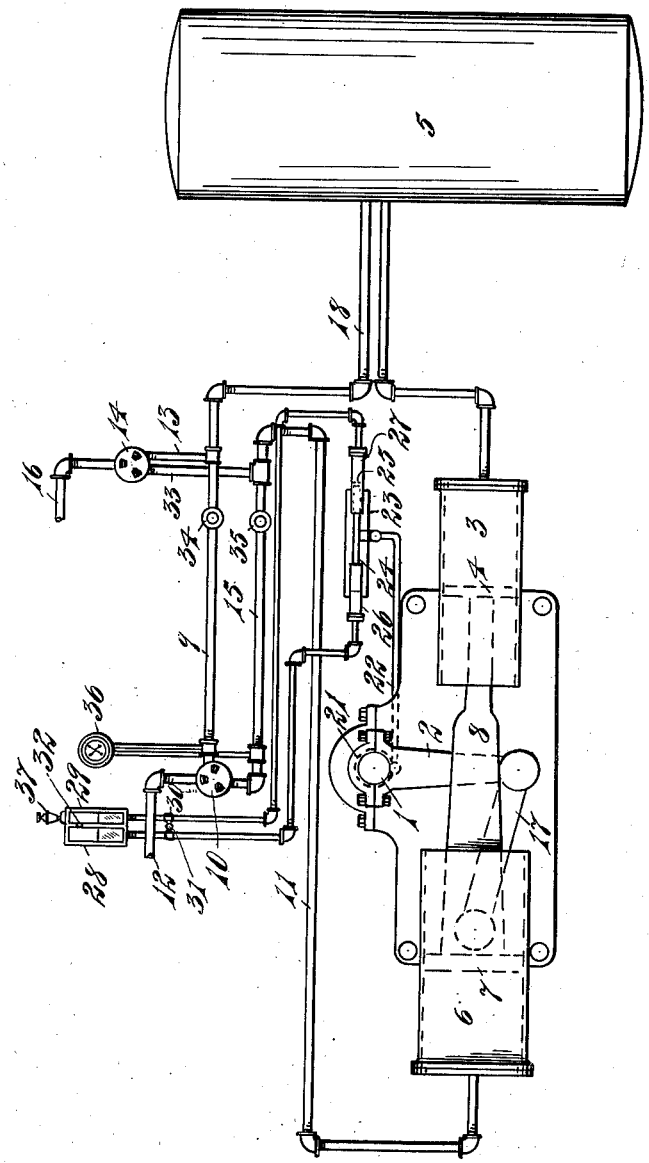
WITNESSES
C. E. Doy.
May E. Kott.
INVENTOR
Frank Y. Harrison
By Parker & Burton, Attorneys.

UNITED STATES PATENT OFFICE.

FRANK Y. HARRISON, OF DETROIT, MICHIGAN.

STEERING-GEAR.

No. 845,949.　　　　Specification of Letters Patent.　　　Patented March 5, 1907.

Application filed January 11, 1906. Serial No. 295,519.

*To all whom it may concern:*

Be it known that I, FRANK Y. HARRISON, a citizen of the United States, residing at Detroit, county of Wayne, State of Michigan, have invented a certain new and useful Improvement in Steering-Gear; and I declare the following to be a full, clear, and exact description of the same, such as will enable others skilled in the art to which it pertains to make and use the same, reference being had to the accompanying drawings, which form a part of this specification.

This invention relates to steering-gear for vessels.

It has for its object an improved steering-gear actuated by a fluid under pressure, preferably compressed air. Connected with the steering-gear is an indicator to show the position of the rudder, and there are several controlling-valves by means of which the actuating mechanism of the gear may be controlled from one of several locations.

The drawing is diagrammatic, without any attempt at it being pictorial, and outlines a plan view of the apparatus and its connecting-pipes.

1 indicates the rudder-post; 2, the tiller; 3, a cylinder containing a piston 4, and 6 a cylinder containing a piston 7. The two pistons 4 and 7 are connected by a single rod 8, and these two pistons and the cylinders in which they are contained differ in cross-sectional area, the area of the cylinder 6 considerably exceeding that of the cylinder 3. For most efficient work the cross-sectional area of the cylinder 6 should be twice that of the cylinder 3.

Fluid under pressure is stored in the tank 5 and acts with a constant pressure against the piston 4 in the cylinder 3. The cylinder 6 communicates with the air-tank 5 through a system of pipes in which there are one or several, preferably several, controlling-valves, and these valves are so arranged that each may independently control the flow of air through the conduit-pipes, and they are also arranged that certain of them may continue useful and be employed to control the flow of air although others may have been destroyed or disarranged. In order that this result may be accomplished, the pipe 18, through which the fluid first emerges from the tank 5, is carried past a branch pipe 13 along a continuation-pipe 9 to a three-way controlling-valve 10, thence back along pipe 15, which is, in effect, parallel to pipe 9, past a branch pipe 33, which is a continuation of the branch pipe 13 spoken of above, and thence through a continuation-pipe 11 to the cylinder 6. At the junction of the branch pipes 13 and 33 is a controlling-valve 14, and in the pipe spoken of as a "continuation-pipe" 9 is a manually-actuated valve 34, and in the continuation-pipe 15 is a second manually-actuated valve 35. Other branch pipes similar in all respects to the branch pipes 13 and 33 may be placed in the system at any place along its course, and there may be any number of these. With each branch pipe there must be a pair of manually-actuating valves corresponding to the valves 34 and 35.

The controlling-valve 10, which is at the turning-point of the main pipe, is preferably located in the wheel-house or conning-tower and may be in some position that is dangerous and where the valve itself is liable to be destroyed or injured. In such cases it is only necessary to close the valves 34 and 35, when the controlling-valve 14 is now located at the end of the loop and may be used to control the gear. When the valves 34 and 35 and all the valves corresponding to them are open, all the controlling-valves are equally adapted to be used, and any one may be employed at any time to control the gear.

With each controlling-valve there is an exhaust-pipe—as, for example, the exhaust-pipe 12, connected with the controlling-valve 10, and the exhaust-pipe 16, connected with the controlling-valve 14—and passage into the exhaust-pipe is opened in the three-way valve when the passage through the pipes to the cylinder is closed. Sometimes instead of locating the valves with reference to danger-points they may be located with reference to accessibility for use on special occasions—as, for example, the valve 10 may be in the wheel-house, the valve 14 at the end of the bridge, where it will be especially useful when the vessel is approaching or leaving a wharf.

When either valve is turned to exhaust the cylinder 6, the pressure from the tank 5, which is always pressing into the cylinder 3, moves the pistons and turns the tiller. Upon closing the exhaust and turning the three-way valve to open the conduit for fluid into the cylinder 6 the larger piston 7 is actuated against the smaller piston 4 and turns the tiller in the reverse direction. There is no exhaust or loss of fluid from the cylinder 3 and only such loss of fluid from the cylinder 6 as is sufficient to allow the requisite movement of the piston in one direction. The tiller is directly actuated by pitman 17, which is pivoted to the piston-rod 8.

An indicator is used in connection with the tiller, and this indicator is located at any place that may be desired. The indicator shows the position of the tiller, and to effect this result there is employed a crank-ring 21, which embraces the tiller-post and is provided with a crank-pin, by which it is pivotally connected to link 22. The link 22 is pivotally connected to a shifting frame 23, with which there are connected two pistons 24 and 25. These pistons reciprocate in two cylinders 26 and 27, that are in axial alinement and are connected by suitable piping to a pair of gage-glasses 28 and 29. The entire system of piping is filled with liquid, whose relative height in the gage-glasses 28 and 29 may be adjusted by means of cross-pipe 30 and valve 31. There is air communication between the two gage-glasses through a small passage 32, and provision is made for filling the indicator-pipes through a plug-closed opening 33. After adjustment the valve 31 is closed, and thereafter upon the oscillation of the rudder-post the pistons 24 and 25 are correspondingly reciprocated, and the amount of the reciprocation is indicated by the variation in height of the fluid in the two sight-gages 28 and 29.

For convenience a pressure-gage 36 is placed on the system of piping through which the pressure fluid is conducted in order that the pressure of fluid in the tank 5 may be at all times indicated.

What I claim is—

1. In combination with a rudder-post and tiller therefor, a pair of cylinders of different cross area acting in opposition the one to the other, the smaller of said cylinders being in constant connection with a source of fluid-pressure, and the larger of said cylinders being in controlled communication with the same source of fluid-pressure, substantially as described.

2. In combination with a rudder-post and tiller therefor, a pair of cylinders in opposed relation, one of said cylinders being connected to the tiller-post by a link, a source of fluid-pressure in constant communication with one of said cylinders, a valved communication between the same source of fluid-pressure and the other of said cylinders, and an indicator actuated by the rudder-post, substantially as described.

3. In combination with a rudder-post provided with a tiller, a pair of cylinders one on each side of said post in axial alinement the one with the other, means connecting said tiller and the piston of one of the cylinders, a rigid connecting-bar from the piston of one cylinder to that of the other, a supply-tank from which actuating fluid is continuously fed to one of said cylinders, a system of pipes leading from said tank to the other of said cylinders, and means located at a plurality of points along said pipes by the use of any one of which the flow of actuating fluid therethrough may be controlled, substantially as described.

In testimony whereof I sign this specification in the presence of two witnesses.

FRANK Y. HARRISON.

Witnesses:
CHARLES F. BURTON,
LOTTA LEE HAYTON.